(12) United States Patent
Lee et al.

(10) Patent No.: US 10,810,432 B2
(45) Date of Patent: Oct. 20, 2020

(54) METHODS AND SYSTEMS FOR DIFFERENTIATING ONE OR MORE OBJECTS IN A VIDEO

(71) Applicant: MOTOROLA SOLUTIONS, INC., Chicago, IL (US)

(72) Inventors: Kang Bum Lee, Des Plaines, IL (US); Daniel A. Law, Glencoe, IL (US); Philip E. May, Palatine, IL (US); Shwetal S. Parikh, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 126 days.

(21) Appl. No.: 16/053,092

(22) Filed: Aug. 2, 2018

(65) Prior Publication Data
US 2020/0042797 A1    Feb. 6, 2020

(51) Int. Cl.
*G06K 9/00* (2006.01)
*H04N 5/445* (2011.01)
*G06K 9/62* (2006.01)
*G06F 3/0484* (2013.01)

(52) U.S. Cl.
CPC ....... *G06K 9/00718* (2013.01); *G06K 9/6215* (2013.01); *H04N 5/44504* (2013.01); *G06F 3/04847* (2013.01)

(58) Field of Classification Search
CPC ............. G06K 9/00718; G06K 9/6215; H04N 5/44504; G06F 3/04847
See application file for complete search history.

(56) References Cited

U.S. PATENT DOCUMENTS

| 7,324,693 B2 | 1/2008 | Chen |
| 9,949,697 B2 | 4/2018 | Iscoe et al. |
| 2004/0131254 A1* | 7/2004 | Liang .................. A61B 5/7264 382/181 |
| 2017/0293356 A1 | 10/2017 | Khaderi et al. |

(Continued)

FOREIGN PATENT DOCUMENTS

| CN | 101464946 | 6/2009 |
| WO | 2018068146 | 4/2018 |

OTHER PUBLICATIONS

Edgybees, "Augmented Reality, Up to Speed," website (2017) 2 pages, https://edgybees.com/.

(Continued)

*Primary Examiner* — Chuong A Ngo
(74) *Attorney, Agent, or Firm* — Michael Best & Friedrich LLP

(57) ABSTRACT

Methods and systems for differentiating an object in a video. One system includes an electronic computing device including an electronic processor configured to determine context information associated with a video. The electronic processor is further configured to determine an object included in the video to be differentiated from other objects included in the video. The electronic processor is further configured to determine a level of differentiation for the object based on the context information. The electronic processor is further configured to alter the video to create an altered video that shows the object differentiated from the other objects in accordance with the level of differentiation. The electronic processor is further configured to provide the altered video to a display.

20 Claims, 8 Drawing Sheets

(56) References Cited

U.S. PATENT DOCUMENTS

2018/0095607 A1  4/2018  Proctor
2018/0182142 A1  6/2018  Lim et al.
2018/0182167 A1  6/2018  Lim et al.
2018/0182170 A1  6/2018  Lim et al.
2019/0268566 A1  8/2019  Firpo et al.

OTHER PUBLICATIONS

Wikipedia, "Arkangel (Black Mirror)" Nefflix show (aired on Dec. 29, 2017) season 4, episode 2, 7 pages, https://en.wikipedia.org/wiki/Arkangel_(Black_Mirror).

Utility Associates, Inc, "AvailWeb, The seamless Solution," website article (2014-2017) 9 pages, https://www.bodyworn.com/platform/evidence-management/?rq=redact.

* cited by examiner

INCIDENT TYPE: SUSPECT IN PURSUIT
INCIDENT LOCATION: 123 MAIN STREET

VIDEO PRESENTATION AREA

OBJECT AND DIFFERENTIATION CONTROL OPTIONS

| OBJECT | OBJECT TO BE DIFFERENTIATED | LEVEL OF DIFFERENTIATION CONTROL | |
|---|---|---|---|
| MEMBERS OF TALKGROUP 1 | ☐ YES ☒ NO | ☐ SHAPE ALTERATION ☐ COLOR SATURATION | MIN ——○—— MAX <br> MIN ——○—— MAX |
| OFFICER BOB | ☒ YES ☐ NO | ☐ BLUR LEVEL ☒ COLOR SATURATION | MIN ——○—— MAX <br> MIN ——○—— MAX |
| SUSPECT 1 | ☒ YES ☐ NO | ☒ BLUR LEVEL ☐ COLOR SATURATION | MIN ——○—— MAX <br> MIN ——○—— MAX |

FIG. 6

METHODS AND SYSTEMS FOR DIFFERENTIATING ONE OR MORE OBJECTS IN A VIDEO

BACKGROUND OF THE INVENTION

The use of devices such as tablets, laptop computers, desktop computers, telephones (for example, cellular, landline, or satellite), devices with an interactive display, other communication devices, and combinations thereof has become prevalent. These devices provide users with instant access to increasingly valuable information, resources, and databases. These devices may also display a video to a user (for example, a dispatcher) to aid the user in making informed decisions, for example, of a next action to take or how to resolve a situation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6 illustrates a graphical user interface displayed on a display of the communication device of FIG. 3 according to one example embodiment.

Figure 1:
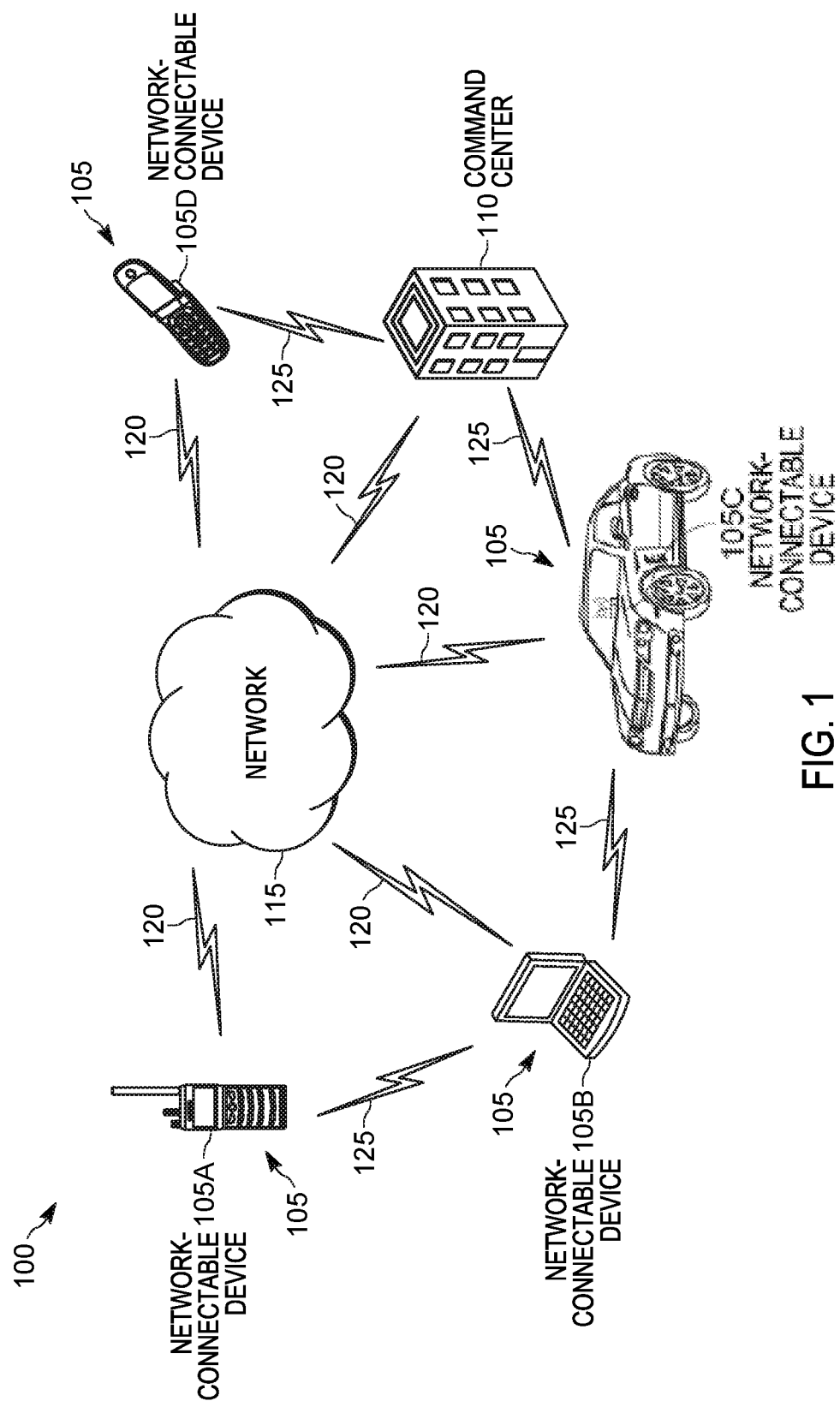
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One or more devices such as tablets, laptops, desktop computers, telephones (for example, cellular, landline, or satellite), devices with an interactive display, and other communication devices may be a part of a dispatch console operated by a dispatcher such as a public safety dispatcher. In some situations, the dispatch console displays a video to the dispatcher to aid the dispatcher in making informed decisions, for example, a next action to take or how to provide assistance to help handle an incident.

However, in some situations, a dispatcher may have difficulty locating and/or tracking objects of interest in a video. For example, when the quality of video is low such that video is blurry, a dispatcher may not be able to identify and/or track an object of interest in the video. In some embodiments, an object of interest is an object included in the video that the dispatcher desires to identify, monitor, and/or track. For example, an object of interest is a person, for example, a police officer that was called to a scene of an incident and is to be monitored by the dispatcher or a crime suspect being followed by public safety personnel. The object of interest may also be an animal or an inanimate object, for example, a vehicle, a suspicious package, a weapon, and the like. As another example of when the dispatcher may have difficulty locating and/or tracking objects of interest in a video, when a zoom level of a camera capturing the video is too wide or when the camera is located far away from a location being monitored (for example, a traffic camera capturing video of an incident occurring down a city block), the dispatcher may not be able to identify and/or track an object of interest. As another example, when the video is of a crowd that includes a large number of people, the dispatcher may not be able to identify and/or track an object of interest in the video (for example, a specific person within the crowd). As yet another example, obstacles in the video, for example, tree branches may obstruct the view of an object of interest in the video. As another example, the video may include camera lens interference, for example, light reflection, vignetting, and the like that may prevent the dispatcher from identifying and/or tracking the object of interest.

Additionally, in some situations, dispatchers may suffer mental and/or emotional trauma from viewing a video that includes gruesome or unpleasant images, for example, a gunshot wound or a fatally-injured officer or citizen. Along similar lines, a recorded video of an incident may be presented to viewers after the incident has occurred (for example, to jurors in a courtroom setting). In some such situations, it may be desirable to prevent the viewers from being able to view certain details of the recorded video. For example, it may be desirable to prevent the viewers from being able to see the face of a juvenile present in the recorded video to keep the identity of the juvenile anonymous. Thus, there is a technological problem with respect to the interaction between a user (for example, a dispatcher or other viewer of a video) and a user interface that provides one or more videos to the user (for example, one or more output devices of a dispatch console or other devices configured to present videos). In particular, video is presented in a manner that makes viewing the video and locating and/or tracking objects of interest in a video difficult for the user, which limits the potential usefulness and benefits of video technology.

Disclosed are, among other things, a method, device, and system for one or more electronic processors to differentiate an object included in a video from other objects included in the video. In some embodiments, the one or more electronic processors alter the video to create an altered video that shows the object differentiated from the other objects included in the video in accordance with a determined level of differentiation. Certain examples of the disclosed method, device, and system address the above-noted technological problem by improving the interaction between a user and a user interface that provides one or more videos to the user. In some situations, the disclosed method, device, and system determine that the object should be emphasized with respect to the other objects included in the video for easier identification and/or tracking by the dispatcher. In other situations, the disclosed method, device, and system determine that the object should be obscured to prevent the dispatcher from viewing gruesome or unpleasant details of the object that may cause the dispatcher to suffer trauma when the details of the object are not obscured. Thus, the disclosed method, device, and system may allow the dispatcher to interact with the user interface of a dispatch console more effectively and may prevent cognitive overload of a dispatcher that may result when too much information is presented to the dispatcher via a dispatch console (for example, an unaltered video of a large crowd without any objects included in the video emphasized to increase ease of monitoring one or more objects).

In some situations, the disclosed method, device, and system present a recorded video to viewers (for example, in a courtroom setting) and determine that one or more objects should be obscured in accordance with a user input received via an input device. For example, the user input indicates that the identities of the people included in the video should be kept anonymous. In response to receiving such a user input, the disclosed method, device, and system obscure the faces of the people included in the video (for example, by blurring the faces). In some embodiments, the disclosed method, device, and system displays different user-selectable options relating to one or more of the objects to be differentiated and the level of differentiation based on at least one of the group consisting of context information associated with the video and context information associated with a user. Thus, the disclosed method, device, and system may simplify a user interface that displays user-selectable options by displaying options that specifically apply to a certain video while not displaying options that do not apply the video.

In some situations, a public safety command center includes one or more dispatch consoles each operated by a different dispatcher. In some situations, the dispatchers include emergency call-takers and incident-handling dispatchers. In some embodiments, an emergency call-taker is a person who analyzes a received data feed from a citizen via an emergency call-taker device (for example, voice call, live or recorded video feed, text message, and the like), identifies an incident based on the data feed, and decides how to respond to the data feed to help the citizen and handle the incident. For example, the emergency call-taker may transfer the data feed to a different agency (for example, animal control), take no action (for example, when the data feed is a prank call or an accidental call), transfer the data feed to the dispatch console of an incident-handling dispatcher, and the like. In some embodiments, an emergency call-taker device operated by an emergency call-taker determines how to respond to the data feed to help the citizen and handle the incident in an automated manner (for example, using one or more of voice analytics, video analytics, text analytics, and the like to take a predetermined action based on the received data feed, for example, transferring the data feed to a dispatch console of an appropriate dispatcher).

In some situations, a dispatch console of an incident-handling dispatcher receives one or more data feeds from citizens in response to an emergency call-taker using an emergency call-taking device to transfer the one or more data feeds to the dispatch console of the incident-handling dispatcher. In some situations, the incident-handling dispatcher is temporarily assigned to an incident in which officers are supervising, maintaining, providing assistance, and the like (for example, a concert, a sporting event, management of a theme park or other entertainment venue, and the like). In some embodiments, the incident is an event, occurrence, or situation in which officers are involved. In some embodiments, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

In some embodiments, the dispatch console of the incident-handling dispatcher additionally or alternatively receives one or more data feeds from devices of officers handling the incident. In some embodiments, officers are personnel acting on behalf of a dispatching, supervising, or responsible agency/entity (for example, employees of a theme park; security guards at a concert or sporting event; public safety officers such as police officers, firefighters, and paramedics; and the like). As an example of the dispatch console receiving data feeds from devices of officers, the dispatch console of the incident-handling dispatcher receives a video feed or an image feed from one or more of a camera of a network-connectable device such as a smart telephone, a dash camera of a vehicle, and a body-worn camera of an officer. As another example, the dispatch console of the incident-handling dispatcher receives a data feed from a biometric sensor that monitors biometric data of an officer. In some embodiments, the dispatch console receives a data feed from a device that is not operated by a citizen or an officer such as one or more of a security camera, a traffic camera, an alarm notification system that monitors a building, a park, a fence, a parking lot, and other geographical locations (for example, a fire alarm, a toxic gas alarm, and the like), and the like.

One embodiment provides an electronic computing device including an electronic processor configured to determine context information associated with a video. The electronic processor is further configured to determine an object included in the video to be differentiated from other objects included in the video. The electronic processor is further configured to determine a level of differentiation for the object based on the context information. The electronic processor is further configured to alter the video to create an altered video that shows the object differentiated from the other objects in accordance with the level of differentiation. The electronic processor is further configured to provide the altered video to a display.

Another embodiment provides a method of differentiating an object in a video. The method includes determining, with an electronic processor of an electronic computing device, context information associated with a video. The method further includes determining, with the electronic processor, an object included in the video to be differentiated from other objects included in the video. The method further includes determining, with the electronic processor, a level of differentiation for the object based on the context information. The method further includes altering, with the electronic processor, the video to create an altered video that shows the object differentiated from the other objects in accordance with the level of differentiation. The method further includes providing the altered video to a display.

Another embodiment provides an electronic computing device including an electronic processor configured to determine one or more of context information associated with a video and context information associated with a user of the electronic computing device. The electronic processor is further configured to display one or more user-selectable options relating to at least one selected from the group consisting of an object to be differentiated from other objects included in the video and a level of differentiation for the object based on the one or more of the context information associated with a video and the context information associated with the user of the electronic computing device. The electronic processor is further configured to determine, based on a received user input selecting at least one of the one or more user-selectable options, one or more of the object included in the video to be differentiated and the level of differentiation for the object. The electronic processor is further configured to alter the video to create an altered video that shows the object differentiated from the other objects in accordance with the level of differentiation. The electronic processor is further configured to provide the altered video to a display.

FIG. 1 is a block diagram of a communication system 100 according to one example embodiment. The communication system 100 includes various network-connectable devices 105A through 105D. In the following description, when explaining how a single network-connectable device functions, a reference to network-connectable device 105 is used. As indicated by FIG. 1, the network-connectable device 105 may be any one of a number of different types of network-connectable devices. For example, network-connectable device 105A is a portable communication device carried by an officer during patrol (for example, an employee of a theme park; a security guard at a concert or sporting event; a public safety officer such as police officer, firefighter, and paramedic; and the like). In some embodiments, network-connectable device 105A is a smart phone, a battery powered portable radio, a body wearable camera, a biometric sensor, or similar device. As another example, network-connectable device 105B is a laptop computer that can receive input from a user via a keyboard, a touchscreen display, a microphone (for example, voice commands), and the like. In other embodiments, network-connectable device 105B is a tablet, a desktop computer, or a similar device. As another example, network-connectable device 105C is a vehicular mobile communication device (for example, a police vehicle, a fire truck, an ambulance, a maintenance vehicle such as a tow truck, and the like). Network-connectable device 105C may include, but is not limited to, a dashboard camera, a microphone, a laptop, and the like. As yet another example, network-connectable device 105D is a smart phone operated by a civilian. Network-connectable device 105D may be any type of network-connectable device (for example, a laptop, desktop computer, tablet, smart watch, and the like).

The types of network-connectable devices 105A through 105D described above and shown in FIG. 1 are merely examples. In other embodiments, the communication system 100 includes other types of network-connectable devices. In some embodiments, the communication system 100 includes more or fewer network-connectable devices 105 than the quantity of network-connectable devices 105 shown in FIG. 1.

As shown in FIG. 1, the communication system 100 also includes a command center 110. For example, the command center 110 is a security management office at a theme park or a public safety command center such as a police headquarters, fire station, dispatch center, public safety answering point (PSAP), operations center, command and control facility, and the like. In some embodiments, the command center 110 includes one or more network-connectable devices 105 that are part of the communication system 100 as explained below with respect to FIG. 2. In the following description, when explaining communication to or from the command center 110, it should be understood that such communication is occurring to or from one or more of the network-connectable devices 105 included in the command center 110.

As indicated in FIG. 1, the network-connectable devices 105A through 105D and the command center 110 may communicate with each other over a network 115 over respective wireless links 120 and via corresponding network interfaces including one or more transceiver circuits (for example, by sending and receiving radio signals). The network 115 may include wireless and wired portions. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned.

Also as shown in FIG. 1, in some embodiments, the network-connectable devices 105A through 105D and the command center 110 may communicate directly with each other via direct-mode wireless link(s) 125 using a communication channel or connection that is outside of the network 115. For example, the network-connectable devices 105A through 105D and the command center 110 communicate directly with each other when they are within a predetermined distance from each other. Although FIG. 1 only shows direct-mode wireless links 125 between adjacent network-connectable devices 105, in some embodiments, any one of the network-connectable devices 105 and the command center 110 is capable of communicating with another network-connectable device 105 or the command center 110 via a direct-mode wireless link 125.

Figure 2:
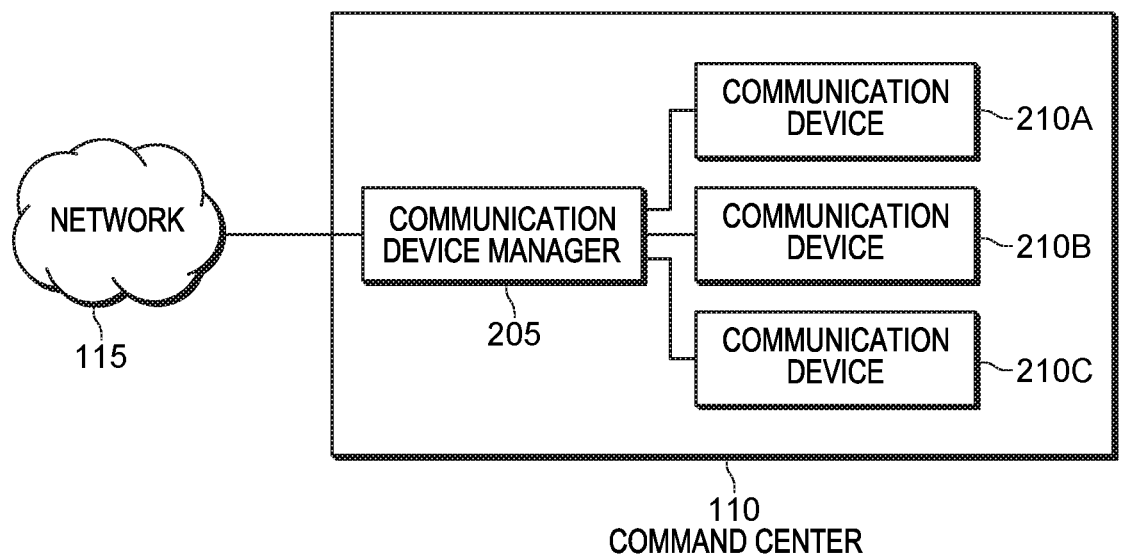
FIG. 2 is a block diagram of a command center included in the communication system of FIG. 1 according to one example embodiment.

FIG. 2 is a block diagram of the command center 110 according to one example embodiment. In some embodiments, the command center 110 includes a communication device manager 205 and a plurality of communication devices 210A through 210C that are similar to and may be considered network-connectable devices 105 of FIG. 1 as explained above. In the following description, when explaining how a single communication device functions, a reference to communication device 210 is used. In some embodiments, the communication devices 210 are dispatch consoles that are each operated by a separate dispatcher (for example, public safety dispatch consoles each operated by a separate incident-handling dispatcher as explained above). In some embodiments, the communication device manager 205 is communicatively coupled to the network 115 and to the communication devices 210A through 210C via wired connections, wireless connections, or a combination thereof. As explained in greater detail below, the communication device manager 205 is configured to receive one or more data feeds from one or more network-connectable devices 105 over the network 115. In some embodiments, the communication device manager 205 is configured to control which received data feeds are provided to which communication devices 210 and whether the received data feeds are to be presented on the respective communication devices 210. In some embodiments, the communication devices 210 are configured to communicate through the communication device manager 205 to one or more network-connectable devices 105 over the network 115.

Although the communication devices 210 are described as being located at the command center 110, in some embodiments, the communication devices 210 are portable devices, for example, the network-connectable devices 105 described above. Additionally, the terms "network-connectable device" and "communication device" are used throughout this specification to explain example use situations. However, a single device, for example, a portable radio of a public safety officer, may be considered a network-connectable device 105 in one situation and may be considered a communication device 210 in another situation.

In some embodiments, the command center 110 includes additional communication devices operated by emergency call-takers that receive one data feed at a time from a queue of data feeds intended for the command center 110. For example, the emergency call-takers are 911 call-takers operating 911 call-taking devices that receive data feeds from citizens who enter 9-1-1 on their network-connectable device 105 to transmit a data feed to the command center 110. In such embodiments, these additional communication devices operated by emergency call-takers may be integrated into the communication device manager 205 or may be communicatively coupled to the communication device manager 205. Similarly, while FIG. 2 shows the communication devices 210 and the communication device manager 205 as separate devices, in some embodiments, the communication devices 210 are integrated into the communication device manager 205 and directly controlled by the communication device manager 205. In other embodiments, the command center 110 may not include a separate communication device manager 205 and the functionality of the communication device manager 205 described below may be integrated into each of the communication devices 210. In some embodiments, the command center 110 includes more or fewer communication devices 210 than the quantity of communication devices 210 shown in FIG. 2.

Figure 3:
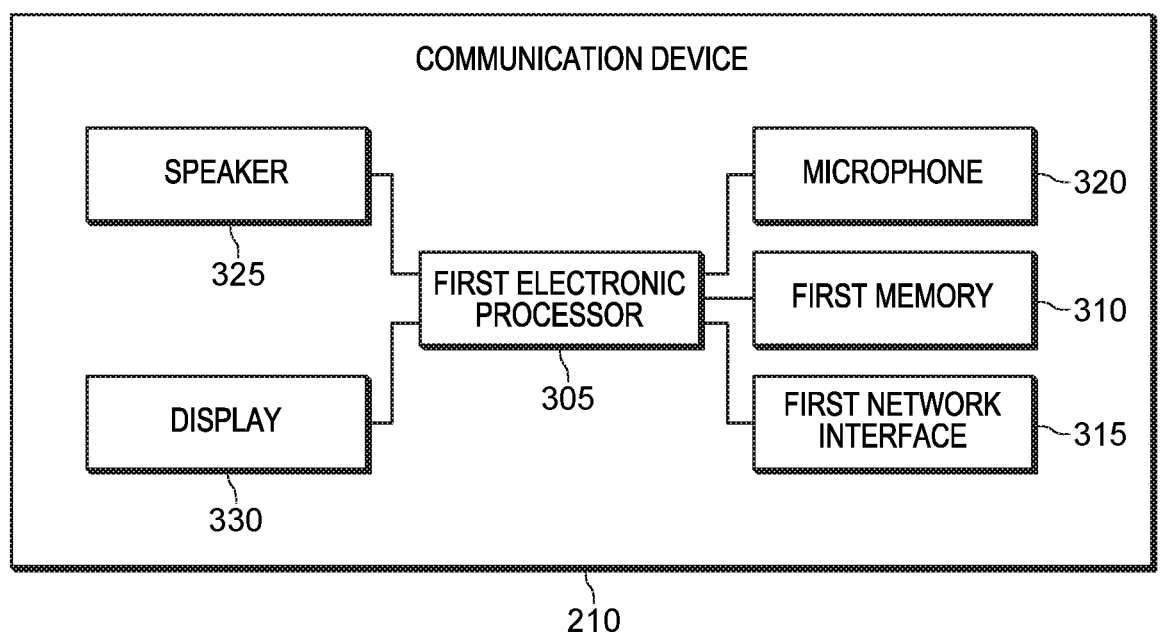
FIG. 3 is a block diagram of a communication device included in the command center of FIG. 2 according to one example embodiment.

FIG. 3 is a block diagram of a communication device 210 according to one example embodiment. In the embodiment illustrated, the communication device 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the communication device 210 includes fewer or additional components in configurations different from that illustrated in FIG. 3. For example, the communication device 210 may additionally include a push-to-talk button and/or a camera. As another example, the communication device 210 may include one or more additional input devices, for example, a computer mouse and/or a keyboard that receive inputs from a user of the communication device 210. As yet another example, the communication device 210 may be an information-receiving device that receives and displays information without including data transmission capabilities. In some embodiments, the communication device 210 includes one or more sensors that monitor a context of a user of the communication device 210 and may be referred to as context sensors. For example, the one or more sensors are biometric sensors that monitor one or more of a heart rate of the user, a body temperature of the user, a blood pressure of the user, and other biometric characteristics of the user. In some embodiments, the one or more of the measured biometric characteristics are used to determine a stress level of a user, for example, a dispatcher viewing a received video feed. In some embodiments, the communication device 210 performs functionality other than the functionality described below.

The first memory 310 may include read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform the methods described herein. In some embodiments, the first memory 310 is implemented on devices located at the command center 110, at a remote location, or at a remote cloud-computing cluster.

The first network interface 315 sends and receives data to and from the communication device manager 205. In some embodiments, the first network interface 315 additionally or alternatively sends and receives data to and from the network 115 without the data first passing through a separate communication device manager 205. In some embodiments, the first network interface 315 includes one or more transceivers for wirelessly communicating with the communication device manager 205 and/or the network 115. Alternatively or in addition, the first network interface 315 may include a connector or port for receiving a wired connection to the communication device manager 205 and/or the network 115, such as an Ethernet cable. The first electronic processor 305 may receive one or more data feeds (for example, a video feed, an audio feed, an image feed, a text feed, a sensor input data feed, and the like) over the network 115 through the first network interface 315 (for example, data feeds generated by one or more network-connectable devices 105 and transmitted over the network 115). In some embodiments, the first electronic processor 305 receives data feeds through the first network interface 315 directly from a network-connectable device 105. In some embodiments, communication of data feeds may occur in approximately real-time. For example, the communication device 210 displays a real-time video feed via the display 330 to be viewed by a dispatcher. The first electronic processor 305 may communicate data generated by the communication device 210 over the network 115 through the first network interface 315, for example, for receipt by one or more network-connectable devices 105. For example, the first electronic processor 305 receives electrical signals representing sound from the microphone 320 and may communicate information relating to the electrical signals over the network 115 through the first network interface 315 to other devices, for example, to one or more network-connectable devices 105. Similarly, the first electronic processor 305 may output the one or more data feeds received from the network 115 through the first network interface 315, for example from a network-connectable device 105, through the speaker 325, the display 330, or a combination thereof.

The display 330 displays images, video, text, and/or data from sensor inputs to the user (for example, an incident-handling dispatcher). The display 330 may be a liquid crystal display (LCD) screen or an organic light emitting display (OLED) display screen. In some embodiments, a touch sensitive input interface may be incorporated into the display 330 as well, allowing the user to interact with content provided to the display 330. In some embodiments, the display 330 includes a projector or future-developed display technologies. In some embodiments, the speaker 325 and the display 330 are referred to as output devices that present data feeds to a user of the communication device 210 (for example, an incident-handling dispatcher). In some embodiments, the microphone 320, a computer mouse, and/or a keyboard or a touch-sensitive display are referred to as input devices that receive input from a user of the communication device 210.

In some embodiments, the network-connectable devices 105 include similar components as those shown in FIG. 3 with respect to the communication device 210. In some embodiments, the network-connectable devices 105 include fewer or additional components in configurations different from that illustrated in FIG. 3. For example, a network-connectable device 105 may also include one or more of a push-to-talk button to initiate voice communication over the network 115 (for example, an audio feed), a camera to capture a video feed and/or an image feed to be transmitted over the network 115, and a location component (for example, a global positioning system receiver) configured to determine the geographic coordinates of the location of the network-connectable device 105. In some embodiments, the network-connectable devices 105 transmit their respective location coordinates over the network 115 when transmitting data feeds to the command center 110 (for example, location information is stored as metadata associated with a data feed). Similarly, in some embodiments, the network-connectable devices 105 also include a time stamp when transmitting a data feed such that the command center 110 may determine a time of capture of the data feed or a time of transmission of the data feed. In some embodiments, the network-connectable devices 105 transmit a text feed over the network 115 to the command center 110 (for example, a text message from a smart phone, portable radio, or the like that includes alphanumeric and/or numeric data).

In some embodiments, a network-connectable device 105 also includes one or more sensors to generate data related to a user of the network-connectable device 105 and/or an environment of the network-connectable device 105. For example, the network-connectable device 105 may include a biometric sensor to monitor biometric data of a user (for example, a citizen, an officer such as a public safety officer, and the like) such as heart rate, breathing rate, body temperature, and the like. As another example, the network-connectable device 105 may include a pedometer, a sensor-enabled holster to detect when a weapon has been removed from the holster, and/or a sensor that detects when the weapon has been discharged. As yet another example, the network-connectable device 105 may include one or more sensors that monitor an environment of the user such as temperature, humidity, air quality, ambient noise level, and the like.

In some embodiments, one or more sensors communicate over the network 115 and may, themselves, be considered network-connectable devices 105. In other embodiments, one or more sensors are separate from a network-connectable device 105, and the separate sensors are not capable of directly communicating over the network 115. In such embodiments, the separate sensors (for example, a sensor-enabled holster) may communicate over the network 115 via a network-connectable device 105 (for example, a nearby smart phone, portable radio, and the like). For example, such separate sensors form a personal area network (PAN) with the network-connectable device 105 via corresponding short-range PAN transceivers, which may be based on a Bluetooth, Zigbee, Bluetooth Low Energy, WiFi, Near Field Communication (NFC), Radio Frequency ID (RFID) or other short-range wireless protocol. In such embodiments, the combination of the network-connectable device 105 and associated separate sensors that communicate monitored data to the network-connectable device 105 may be referred to as a single network-connectable device 105. In some embodiments, the network-connectable devices 105 transmit one or more sensor input data feeds over the network 115 to the command center 110, for example, to be displayed on a communication device 210 of an incident-handling dispatcher. In some embodiments, the network-connectable devices 105 perform functionality other than the functionality described above.

Figure 4:
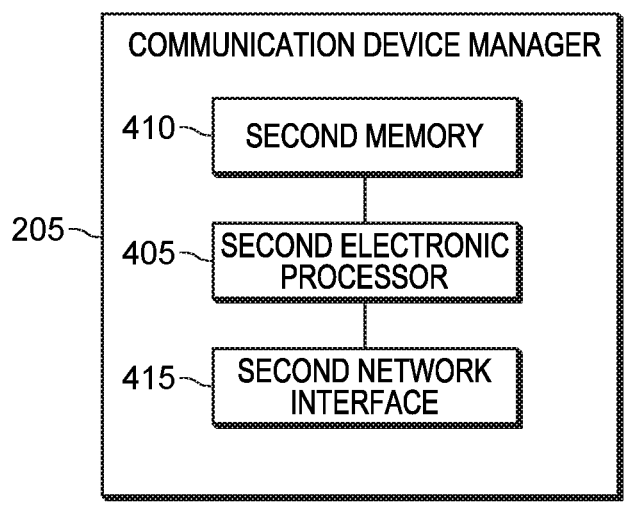
FIG. 4 is a block diagram of a communication device manager included in the command center of FIG. 2 according to one example embodiment.

FIG. 4 is a block diagram of the communication device manager 205 according to one example embodiment. In the example shown, the communication device manager 205 includes a second electronic processor 405 electrically connected to a second memory 410 and a second network interface 415. These components are similar to the like-named components of the communication device 210 explained above with respect to FIG. 3 and function in a similar manner as described above. In some embodiments, the second network interface 415 sends and receives data to and from the network 115 and the communication devices 210. In some embodiments, the communication device manager 205 includes fewer or additional components in configurations different from that illustrated in FIG. 4. For example, the communication device manager 205 may additionally include a display such as a touch screen to allow a user to reprogram settings of the methods described below. In some embodiments, the communication device manager 205 performs functionality other than the functionality described below.

As mentioned above, in some embodiments, the command center 110 further includes initial data feed-receiving devices such as emergency call-taking devices that are integrated with the communication device manager 205 to receive data feeds from the network-connectable devices 105 over the network 115. In other embodiments, the emergency call-taking devices are separate from the communication device manager 205 and are communicatively coupled between the communication device manager 205 and the network 115 to provide data feeds received from the network-connectable devices 105 over the network 115 to the communication device manager 205. In some embodiments, the emergency call-taking devices are communicatively coupled between the communication device manager 205 and the network 115 via wired connections, wireless connections, or a combination thereof.

In some embodiments, the emergency call-taking devices are configured to receive data feeds from network-connectable devices 105 operated by citizens (for example, smart phones of citizens who have entered a user input to transmit one or more data feeds to a public safety command center 110 by, for example, dialing 9-1-1). In some embodiments, each emergency call-taking device is operated by an emergency call-taker (for example, a dispatcher) that may be tasked with identifying a type of incident based on the one or more received data feeds from a network-connectable device 105. For example, the emergency call-taker may enter a user input into the emergency call-taking device to identify the incident as a robbery based on a received voice call (for example, an audio feed or a video feed) where a citizen describes a robbery.

While the emergency call-taking devices are configured to receive data feeds from network-connectable devices 105 operated by citizens, in some embodiments, the communication device manager 205 additionally or alternatively receives data feeds from network-connectable devices 105 operated by officers such as public safety officers. For example, because the public safety officers are trained to identify and handle many different public safety incidents, it may not be necessary for an emergency call-taker to identify a type of incident or how to handle the incident when the data feed is received from a network-connectable device 105 of an officer. Rather, the network-connectable device 105 of a public safety officer may receive a user input from the officer indicating a type of incident (for example, by the officer entering a code that represents the incident type) and other information related to the incident (for example, location, number of victims, and the like). The network-connectable device 105 of the officer then transmits this information as well as any selected data feeds over the network 115 to the communication device manager 205 to be transferred to a communication device 210 of the incident-handling dispatcher that is handling the corresponding incident.

In some embodiments, data feeds are received from network-connectable devices 105 that include, for example, sensors and a camera, that are not operated by a citizen or an officer. For example, data feeds may be received from one or more of a security camera, a traffic camera, an alarm notification system that monitors a building, a park, a fence, a parking lot, and other geographical locations (for example, a fire alarm, a toxic gas alarm, and the like), and the like.

While FIGS. 3 and 4 show separate block diagrams of the communication device 210 and the communication device manager 205, as noted above, in some embodiments, the communication devices 210 and/or the emergency call-taking devices are integrated into the communication device manager 205 and directly controlled by one or more electronic processors of the communication device manager 205. In other embodiments, the functionality of the communication device manager 205 may be integrated into each of the communication devices 210 and/or the emergency call-taking devices. In some embodiments, the communication device manager 205, the communication devices 210, the emergency call-taking devices, and/or a combination thereof are referred to as an electronic computing device that performs the functionality described below. For example, the electronic computing device may be a single electronic processor (for example, the second electronic processor 405 of the communication device manager 205) or a plurality of electronic processors located in the communication device manager 205. In other embodiments, the electronic computing device includes multiple electronic processors distributed across different devices. For example, the electronic computing device is implemented on one or more of the first electronic processors 305 of the communication devices 210, the second electronic processor 405 of the communication device manager 205, and one or more electronic processors located in one or more devices located at the command center 110 (such as emergency call-taking devices), at a remote location, or at a remote cloud-computing cluster. In some embodiments, the electronic computing device is a network-connectable device 105 and an electronic processor of the network-connectable device 105 performs the functionality described below.

As explained above, in some situations, a dispatcher may have difficulty locating and/or tracking objects of interest in a video. Additionally, in some situations, dispatchers may suffer mental and/or emotional trauma from viewing a video that includes gruesome or unpleasant images such as a gunshot wound or a seriously injured officer or citizen. Along similar lines, a recorded video of an incident may be presented to viewers after the incident has occurred (for example, to jurors in a courtroom setting). However, in some situations, it may be desirable to prevent the viewers from being able to view certain details of the recorded video.

Figure 5:
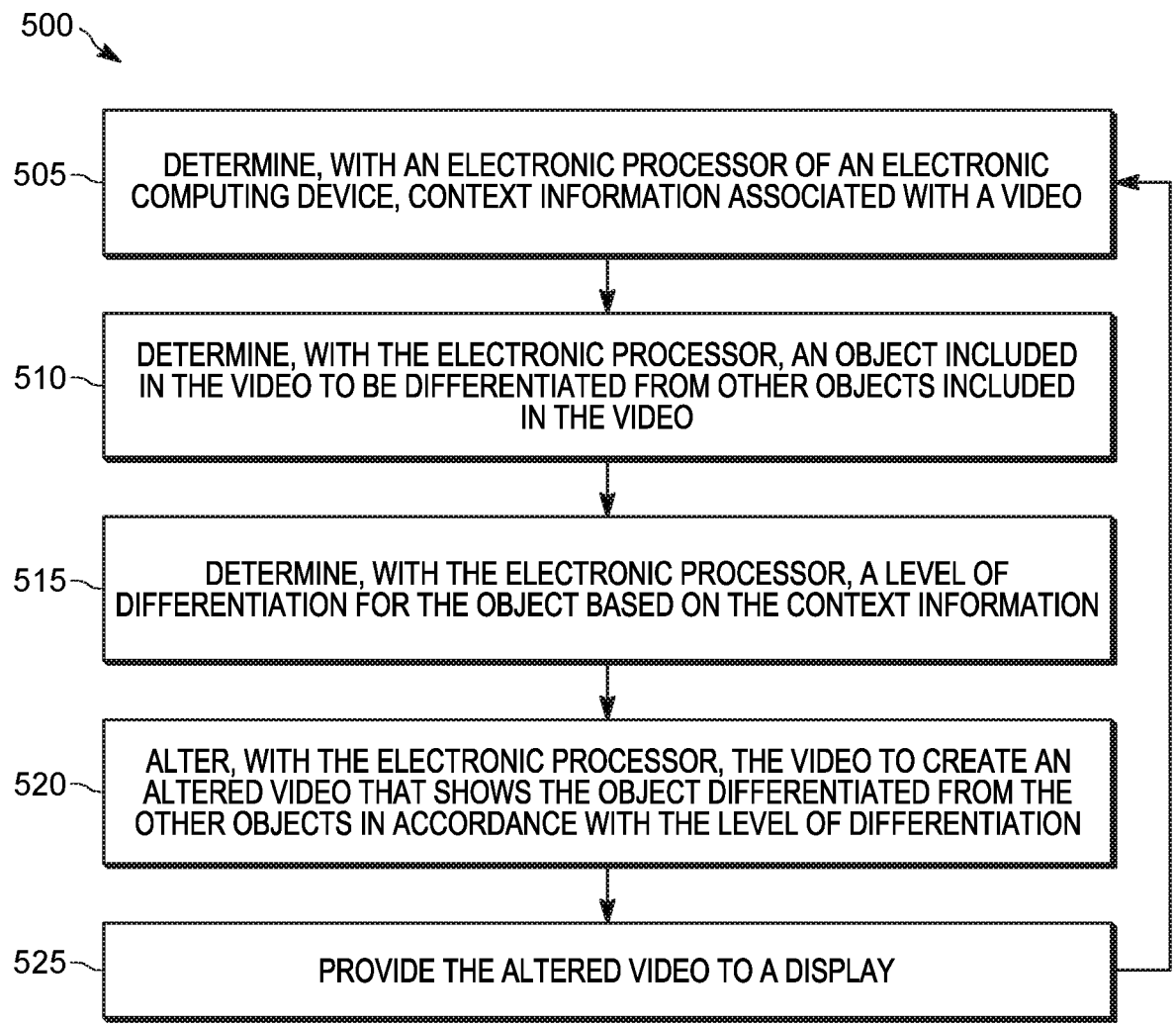
FIG. 5 is a flow chart of a method for differentiating an object in a video according to one example embodiment.

To address this technological problem, the electronic computing device described above performs, in one instance, one or more of the methods explained below. For example, a method 500 of FIG. 5 is executed by the electronic computing device to differentiate one or more objects in a video from other objects in the video. The method 500 addresses the noted technological problem by improving the interaction between a user and a user interface that provides one or more videos to the user. In some situations, when executing the method 500, the electronic computing device determines that the object should be emphasized with respect to the other objects included in the video for easier identification and/or tracking by the dispatcher. In other situations, the electronic computing device determines that the object should be obscured to prevent the dispatcher or other viewers from viewing gruesome or unpleasant details of the object that may cause the dispatcher or the other viewers to suffer trauma when the details of the object are not obscured. Thus, the method 500 may allow the dispatcher to interact with the user interface of a dispatch console more effectively and may prevent cognitive overload of a dispatcher that may result when too much information is presented to the dispatcher via a dispatch console (for example, when an unaltered video of a large crowd without any objects included in the video being emphasized to increase ease of monitoring one or more objects).

FIG. 5 illustrates a flow chart of the method 500 performed by the electronic computing device for differentiating one or more objects in a video from other objects in the video. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure.

At block 505, an electronic processor of the electronic computing device determines context information associated with a video. In some situations, the video is a real-time video feed received, via a network interface, from a network-connectable device 105 to be presented on the display 330 of a communication device 210 of a dispatcher. For example, the network interface is the first network interface 315, the second network interface 415, or a combination thereof as described above. In other situations, the video was previously stored on a memory and is retrieved to be presented on a display to one or more viewers. For example, the video is presented to jurors in a courtroom via a device that includes similar components as the communication device 210 such as the first memory 310 and the display 330. In some embodiments, a stored video is saved and/or exported to another platform or device to be presented. In such embodiments, the stored video may be converted to a different format to allow for saving and/or exporting of the stored video to another platform or device.

The electronic computing device may determine different types of context information associated with the video and may determine the context information associated with the video in different manners. In some embodiments, the context information includes one or more of an intended use of the video, an identification of a public safety officer in the video, an identification of a public safety related object in the video, an identification of a public safety suspect in the video, an identification of members of a talkgroup in the video, and an identification of a location in the video from which a transmission was received from a network-connectable device 105. In some embodiments, the context information of an incident that is the subject of a video is context information associated with the video (for example, an incident type of the incident included in the video). In some embodiments, the electronic computing device determines context information associated with the video based on stored metadata associated with the video. For example, the incident type of an incident is stored with or transmitted with a video after being identified and entered by an emergency call-taker or an officer as explained above. As another example, the intended use of a video is stored as metadata with a video when the video is saved in a memory (for example, when the video is to be used for courtroom purposes or for media/news purposes). In other situations, the intended use of a video may be entered via user input when the video is selected for playback after being stored in a memory. In some embodiments, the electronic computing device determines context information based on information stored in a records management system included on the first memory 310, the second memory 410, and/or another memory of a device located at the command center 110, at a remote location, or at a remote cloud-computing cluster. For example, the electronic computing device determines incidents that have occurred at a location in the past to predict, for example, a type of incident that is currently occurring at the location. In some embodiments, the electronic computing device determines context information based on information and/or notes received by the electronic computing device via user input. For example, a dispatcher or other user enters information relating to an incident that is the subject of a video (for example, incident type, a name of a suspect in pursuit, and the like) and/or an object of interest included the video (for example, a type of weapon being carried by a suspect in pursuit), and the electronic computing device uses such information as context information.

In some embodiments, the electronic computing device determines context information associated with the video by determining context information of the incident that is the subject of the video. For example, the electronic computing device analyzes other data feeds received from network-connectable devices 105 that are associated with the same incident as a received video feed. For example, the electronic computing device receives a video feed from a body camera of an officer and also receives one or more biometric sensor data feeds from one or more biometric sensors associated with the officer. The monitored biometric sensor data received may be context information used by the electronic computing device in some situations as explained in detail below. Other sensor data may additionally or alternatively be context information associated with the video (for example, location data received from a network-connectable device 105 such as a portable radio of an officer, a vehicle location system, and an indoor location system of a building; data received from a pedometer and/or accelerometer that indicates how fast an officer is moving or that indicates whether an officer is walking or running; data received from a sensor-enabled holster to detect when a weapon has been removed from the holster; data received from a sensor that detects when the weapon has been discharged; and the like). Similar to the above example involving a biometric sensor data feed, the electronic computing device may receive an audio feed from a network-connectable device 105 associated with the officer. In some embodiments, the electronic computing device may use voice recognition techniques and/or a natural language processing engine to determine context information associated with the video. For example, the electronic computing device determines that the audio feed includes language relating to an officer verbalizing the word "gun" or "bomb" and determines context information based on these identified keywords. These keywords are merely an example, and the electronic computing device may analyze received audio feeds for other keywords to determine context information.

Similar to analyzed received audio feeds and/or biometric data feeds, the electronic computing device may use image/video recognition techniques to analyze the video itself to determine context information. For example, the electronic computing device determines that the incident type is a fire when the electronic computing device determines that the video includes a public safety related object such as a fire detected using image/video recognition techniques. As another example, the electronic computing device uses object detection techniques to detect certain objects included in the video (for example, a gun, a knife, and the like). In some embodiments, the electronic computing device uses facial recognition techniques to identify certain people included in the video (for example, officers handling the incident, a criminal suspect or fugitive that is in pursuit, and the like). In some embodiments, the location and/or activities of officers and/or suspects is context information associated with the video. In some embodiments, a speed at which a network-connectable device 105 is moving and/or a direction in which the network-connectable device 105 is moving are context information associated with the video. In some situations, the video includes one or more members of a talkgroup (for example, officers handling the incident). One or more of the identity and the location of these talk group members may be considered context information associated with the video that may be used by the electronic computing device as explained in greater detail below.

In some embodiments, one or more of role information, experience information, and specialized skill information of officers handling the incident that is the subject of the video is context information associated with the video. In some embodiments, such information is stored in the first memory 310 or another memory such as a memory of a device located at the command center 110, at a remote location, or at a remote cloud-computing cluster. In some embodiments, historical data about an officer with respect to previous similar incidents is context information stored in one of the memories mentioned above. For example, the historical data corresponds to biometric data of the officer that was received and stored when the officer was handling a previous similar situation. As another example, the historical data corresponds to how an officer handled previous similar incidents. In some embodiments, the historical data corresponds to historical data of a single officer and/or historical data of an agency that includes a plurality of officers. In some embodiments, the electronic computing device retrieves context information from devices operated by third parties (for example, a third party server or memory accessed over the network 115). For example, the electronic computing device obtains weather information for a location that is shown in the video to be used as context information. In other embodiments, the electronic computing device determines weather information using image/video analysis techniques. For example, the electronic computing device uses image/video analysis techniques to identify rain or snow included in the video. As another example of retrieving context information from devices operated by third parties, the context information is one or more of traffic information and social media information. For example, the electronic computing device retrieves recent social media posts of a person identified in the video using image/video analysis techniques. In some embodiments, the electronic computing device uses text analysis techniques to determine context information of the video. For example, the electronic computing device determines that a person identified in the video recently posted a threatening social media message. In some embodiments, the electronic computing device retrieves and analyzes social media information that is similar in time and location to a location from which the video was captured.

At block 510, the electronic computing device determines an object included in the video to be differentiated from other objects included in the video. In some embodiments, the electronic computing device determines one or more objects included in the video to be differentiated from other objects included in the video. In some embodiments, an object to be differentiated is referred to as an object of interest as explained above. For example, an object of interest is an object included in the video that a dispatcher desires to identify, monitor, and/or track. As another example, an object of interest in the video is a face of juvenile that should be obscured or blurred to prevent the identity of the juvenile from being exposed to a viewer. As yet another example, an object of interest is one or more of a wound such as a gunshot wound, a logo, a tattoo, and other identifiable information such as text or graphics included in the video.

The electronic computing device may determine the object of interest to be differentiated in different manners. In some embodiments, the electronic computing device determines the object to be differentiated based on a user input received via an input device. For example, the communication device 210 of a dispatcher receives a selection of an object of interest included in a video via a touch screen, for example, the display 330. As another example, the electronic computing device receives a user input via an input device of the communication device 210 indicating that all officers included in the video that are members of a certain talkgroup are objects of interest. As yet another example, the electronic computing device receives a user input via an input device of the communication device 210 indicating that a suspect named John Doe is an object of interest. Accordingly, the electronic computing device may use facial recognition techniques to attempt to identify John Doe in the video.

In some embodiments, the electronic computing device determines the object to be differentiated based on the context information associated with the video. For example, when the electronic computing device determines that an officer has been wounded (for example, by analyzing one or more biometric sensor data feed and/or by using image/video analysis techniques to recognize a wounded officer), the electronic computing device determines that the wounded officer is an object of interest to be differentiated. As another example, when a view of an officer becomes obstructed (for example, when the officer moves behind a tree), the electronic computing device determines that the officer is an object of interest to be differentiated. As yet another example, when the electronic computing device recognizes a gun included in the video using image/video analysis techniques, the electronic computing device determines that the gun and/or a person possessing the gun is an object of interest to be differentiated. As another example, when the electronic computing device determines that a person identified in the video has recently posted a threatening social media message, the electronic computing device determines that the person is an object of interest to be differentiated. As another example, in response to the electronic computing device recognizing an officer saying "he has a gun" (for example, as determined using voice recognition and/or a natural language processing engine), the electronic computing device determines that the officer is an object of interest to be differentiated. For example, the electronic computing device determines the location of a network-connectable device 105 of the officer that transmitted the message and determines that the officer is an object of interest. Additionally, the electronic computing device may attempt to identify the gun referenced in the officer's message and determine that the gun itself and/or a person possessing the gun are objects of interest. As an example of incident type being used as context information, when the incident type is pursuit of a suspect, the electronic computing device identifies the suspect as an object of interest to be differentiated. In some embodiments, the electronic computing device identifies the object of interest based on historical data of similar incidents. In some embodiments, the context information used by the electronic computing device to determine the object to be differentiated is configurable by a user (for example, at the command center 110). For example, a memory of the electronic computing device stores settings and/or rules received from a user via an input device to control the types of context information that the electronic computing device uses to determine objects of interest.

At block 515, the electronic computing device determines a level of differentiation for the object based on the context information associated with the video, and in some embodiments, based on the object to be differentiated identified at block 510. Depending on the context information associated with the video, the electronic computing device may determine to either emphasize or obscure the object of interest and may also determine to do so in different manners. In some embodiments, the electronic computing device implements a stored mapping feature (for example, a look-up table) that indicates whether each identified object of interest should be emphasized or obscured based on the object of interest itself, the context information associated with the video, and/or a combination thereof. For example, when the electronic computing device determines that a gun is the object of interest, the electronic computing device strongly emphasizes the gun based on the stored mapping feature as described in further detail in the examples below. As another example, when the electronic computing device determines that a face of a juvenile is the object of interest, the electronic computing device obscures the face of the juvenile based on the stored mapping feature. In some embodiments, the stored mapping feature used by the electronic computing device to determine whether objects of interest are to be emphasized and/or obscured is configurable by a user (for example, at the command center 110). For example, a memory of the electronic computing device stores settings and/or rules of the stored mapping feature received from a user via an input device. In addition to and/or as an alternative to using the stored mapping feature to determine whether to emphasize and/or obscure objects of interest, in some situations, the electronic computing device receives a user input indicating whether to emphasize or obscure objects of interest as described in further detail below with respect to FIG. 6.

In some embodiments, the electronic computing device determines that the object should be emphasized with respect to the other objects included in the video for easier identification and/or tracking by a dispatcher viewing the video on, for example, a communication device 210. In some embodiments, the electronic computing device emphasizes an outline of the object or generates an outline of the object (for example, see FIGS. 8A and 8B). For example, the electronic computing device generates a thick line around the object and may display the line in a different color depending on the context information. For example, the electronic computing device generates a red outline around a wounded officer, a green outline around an officer who is actively pursuing a criminal suspect, and an orange outline around an officer who has drawn a weapon (for example, pulled a gun out of its holster). In some embodiments, when a dispatcher is monitoring officers in multiple talkgroups, the electronic computing device generates outlines of different colors around the officers in each talkgroup to allow the dispatcher to better distinguish between the members of each talkgroup. In some embodiments, the electronic computing device adjusts a color saturation of the object to emphasize the object. For example, the electronic computing device displays the object of interest in brighter colors (in other words, decreased greyscale). Similarly, in some embodiments, the electronic computing device adjusts a color saturation of the other objects included in the video to be less bright (in other words, increased greyscale) while leaving the object of interest in its original color to emphasize the object of interest. In some embodiments, the electronic computing device applies a blurring effect to the other objects included in the video while not blurring the object of interest to emphasize the object of interest. In such embodiments, the blurring effect may emphasize the object of interest by allowing a viewer to more easily locate and track the object of interest. In some embodiments, the electronic computing device alters a shape of the object to emphasize the object to a viewer. For example, the electronic computing device may alter an object to be more round or to be less round and include more edges. In some embodiments, the electronic computing device overlays an item over at least one of the group consisting of a portion of the object and an entirety of the object to emphasize the object to a viewer. For example, the overlaid item may be opaque or semi-transparent. For example, the item may be a green dot that appears on the body of an officer or above the head of an officer whose location and movement is being tracked by a dispatcher. As another example, the electronic computing device may place an animated figure over a monitored officer included in the video to emphasize the officer as the officer moves through a crowd of people in the video. As yet another example, based on a known location of the network-connectable device 105 of an officer and the known vantage point of a camera capturing the video (for example, location, angle, zoom, and the like), the electronic computing device may generate an animated figure on top of an obstacle that is obstructing the view of the officer. In other words, based on the known spatial orientation of the officer with respect to the camera, the electronic computing device may show the location of the officer despite an obstacle blocking that view of the officer on the video.

In some embodiments, the electronic computing device determines that the object should be obscured to prevent the dispatcher from viewing gruesome or unpleasant details of the object that may cause the dispatcher to suffer trauma when the details of the object are not obscured. In other situations, the electronic computing device may obscure the object to prevent information about the object from being presented to viewers of the video (for example, blurring the faces of one or more people included in the video to keep the identities of the people included in the video anonymous). In some embodiments, the electronic computing device obscures the object in the video by applying a blurring effect to the object. For example, the electronic computing device blurs a gunshot wound on a leg of an officer when the context information indicates that an officer has been shot in the leg. As another example, the electronic computing device blurs the face of a juvenile included in the video when the electronic computing device identifies a juvenile in the video based on the context information (see FIGS. 9A and 9B). As yet another example, the electronic computing device blurs the face of an officer included in the video when context information associated with the video (for example, in the form of metadata) indicates that the intended use of the video is for media purposes. Blurring may prevent viewers of the video (for example, the general public) from being able to identify the officer. In some embodiments, the electronic computing device obscures the object by altering the shape of the object and/or overlaying an item over at least one of the group consisting of a portion of the object and an entirety of the object. For example, the electronic computing device distorts the shape of the face of juvenile included in a video or the face of the officer included in the video such that the identity of the juvenile remains anonymous. As another example, the electronic computing device places a black bar over a gunshot wound on the leg of an officer to prevent the gunshot wound from being seen by viewers of the video such as a dispatcher (see FIGS. 9A and 9B).

At block 520, the electronic computing device alters the video to create an altered video that shows the object differentiated from the other objects included in the video in accordance with the level of differentiation. In some embodiments, the electronic computing device creates the altered video to emphasize or obscure one or more objects included in the video as explained in the above examples with respect to block 515 (see FIGS. 8A through 9B). In some embodiments, the electronic computing device continues to alter subsequently-captured frames of the video that include the one or more objects of interest until one or more of a predetermined period of time elapses, a predefined event is detected (for example, an end of the incident, a gun being re-holstered, a heart rate of a monitored officer decreasing below a threshold, and the like), and a user input is received that requests that the electronic computing device cease differentiating the one or more objects of interest.

At block 525, the electronic computing device provides the altered video to a display, for example, to be viewed by a user. For example, the electronic computing device presents the altered video on the display 330 of a communication device 210 of a dispatcher. As another example, the electronic computing device presents the altered video on a display of another device similar to the communication device 210 that is used in a courtroom setting and/or in a public media/news setting. In some embodiments, the display 330 is at least one of an augmented reality display, a virtual reality display, and a mixed reality display. For example, the display 330 is an element of a head-mounted display that includes three-dimensional displaying capabilities. In some embodiments, the electronic computing device presents the altered video on another device similar to the communication device 210 that includes at least one of an augmented reality display, a virtual reality display, and a mixed reality display.

In some embodiments, the electronic computing device is configured to store at least one of the group consisting of the video and the altered video in a volatile or non-volatile memory. For example, the electronic computing device stores the video and/or the altered video in the first memory 310, the second memory 410, and/or another memory of a device located at the command center 110, at a remote location, or at a remote cloud-computing cluster. In some embodiments, the stored altered video may be played back in the future, for example, in a courtroom setting or a dispatcher training setting to determine the content of the altered video that was displayed to a dispatcher that prompted the dispatcher to make certain decisions when handling the incident. The originally-received video may also be stored for playback in the future to allow users to determine how the electronic computing device altered the video before presenting the altered video to the user. For example, by comparing the stored original video to the stored altered video, users such as public safety officers at the command center 110 may reprogram settings of the electronic computing device to adjust how future-received videos are altered by the electronic computing device. In some embodiments, a stored video, for example, an originally-received video and/or an altered video, is saved and/or exported to another platform or device to be presented. In such embodiments, the stored video may be converted to a different format to allow for saving and/or exporting of the stored video to another platform or device.

After executing block 525, the method 500 proceeds back to block 505 to repeat the method 500. In some embodiments, repeating of the method 500 allows the electronic computing device to change the alteration of the video in response to determining that the context information associated with the video has changed and/or that new context information has become available. In some embodiments, the electronic computing device determines that the context information associated with the video has changed, and determines a second level of differentiation based on the changed context information. The electronic computing device may alter the video to create a second altered video that shows the object differentiated from the other objects in accordance with the second level of differentiation, and provide the second altered video to the display. For example, all officers included in the video that are members of a talkgroup may be shown in the altered video with a green outline to emphasize the officers and allow the dispatcher to more easily locate and track the officers. However, when the context information changes and indicates that one of the officers has been wounded (for example, by analyzing one or more biometric sensor data feed and/or by using image/video analysis techniques to recognize a wounded officer), the electronic computing device changes the outline of the officer to be shown in red in the second altered video. As another example, when the object of interest is a suspect in pursuit, the electronic computing device may emphasize the suspect in one of the example manners explained above (for example, emphasizing an outline of the suspect, adjusting a color saturation of the suspect or of other objects included in the video, overlaying an item of the suspect, and the like). However, when the electronic computing device determines a change of context information in the form of recognition of the suspect pulling a gun out (for example, as determined by image/video analysis techniques, voice analysis techniques or a natural language processing engine, and the like as described above), the electronic computing device may further emphasize the suspect in the second altered video. For example, the electronic computing device further emphasizes the outline of the suspect by making the outline a thicker line. As another example, the electronic computing device further adjusts the color saturation of the suspect or of the other objects included in the video to further emphasize the suspect. As another example, the electronic computing device outlines the officers of a talkgroup that are included in the video in a green outline but when one of the officers communicates over the talkgroup using a portable radio, for example, the electronic computing device changes the outline of the communicating officer to be a different color to emphasize the location of communicating officer to a viewer of the video.

In some embodiments, the electronic computing device may additionally or alternatively use context information associated with a viewer of the video (for example, a dispatcher) to determine the level of differentiation of an object in the video at block 515. In such embodiments, the electronic computing device determines context information associated with a user/viewer of the electronic computing device (for example, heart rate, body temperature, blood pressure, and other biometric characteristics monitored via biometric sensors of the communication device 210). In some embodiments, the electronic computing device uses biometric data associated with the user/viewer to determine a stress level of the user/viewer. For example, a heart rate within a first range may indicate a calm dispatcher while a heart rate in a higher range may indicate a stressed or startled dispatcher. In some embodiments, context information associated with the user/viewer additionally or alternatively is based on training previously received by the user/viewer, certifications of the user/viewer, an authority level or experience level of the user/viewer, a role of the user/viewer, and the like. In some embodiments, such information is stored on the first memory 310, the second memory 410, and/or another memory of a device located at the command center 110, at a remote location, or at a remote cloud-computing cluster. In some embodiments, historical data corresponding to how a dispatcher has handled previous similar incidents and/or how the dispatcher has responded to similar previous videos (for example, stored biometric data of the dispatcher with respect to previous similar incidents) is context information stored in one of the memories mentioned above.

When the electronic computing device determines the level of differentiation of the object based on the context information associated with the user/viewer, the electronic computing device then alters the video to create the altered video that shows the object differentiated from the other objects in accordance with the level of differentiation as explained above with respect to block 520 of FIG. 5. The electronic computing device provides the altered video to a display as explained above with respect to block 525 of FIG. 5 (for example, the display 330 of a communication device 210 of a dispatcher). For example, the electronic computing device recognizes a gunshot wound on the leg of an officer included in the video. Based on the context information associated with a dispatcher operating the communication device 210 and viewing the video, the electronic computing device determines that the dispatcher has been trained to handle severe injuries and determines that the stress level of the user/viewer is below a predetermined threshold (for example, heart rate in a low range). Accordingly, the electronic computing device determines not to differentiate the gunshot wound by blurring the wound, for example. On the other hand, when the electronic computing device determines that the dispatcher has not been trained to handle severe injuries and/or the stress level of the dispatcher is above the predetermined threshold, the electronic computing device differentiates the gunshot wound by applying a blurring effect to the gunshot wound or placing a black bar over the wound (see FIGS. 9A and 9B) so that the wound cannot be clearly observed by the dispatcher.

In some embodiments, the electronic computing device changes the alteration of the video in response to determining that the context information associated with the user/viewer has changed and/or that new context information has become available. In other words, the electronic computing device determines that the context information associated with the viewer has changed, and determines a second level of differentiation based on the changed context information associated with the user/viewer. In some embodiments, the electronic computing device alters the video to create a second altered video that shows the object differentiated from the other objects in accordance with the second level of differentiation, and provides the second altered video to the display. For example, the electronic computing device initially determines not to differentiate the gunshot wound of the officer explained in the above example. However, as the dispatcher handles the incident and further views the video, the electronic computing device determines that the stress level of the dispatcher has increased above a predetermined threshold (for example, a heart rate of the dispatcher has increased to a higher range). In response to this determination, the electronic computing device determines to differentiate the gunshot wound by applying a blurring effect to the gunshot wound so that the wound cannot be clearly observed by the dispatcher. When the electronic computing device determines that the stress level of the dispatcher continues to increase or remain at a high level above the predetermined threshold, the electronic computing device may further alter the video. For example, the electronic computing device increases the blurring effect to make it more difficult for the dispatcher to view the gunshot wound or may generate a black bar over the gunshot wound (see FIGS. 9A and 9B). As another example, the electronic computing device may apply a blurring effect to the face of the officer to reduce the traumatic effect of the video on the dispatcher. This situation is merely an example, and other changes to altered video are possible based on the context information associated with the user/viewer. For example, in response to determining that a stress level of dispatcher is increasing, the electronic computing device may further emphasize already-emphasized objects such as officers included in the video (for example, by making outlines around the officers thicker). In this example, additional emphasis may help an overwhelmed dispatcher to monitor movement of the officers in the video.

In some embodiments, the electronic computing device displays one or more user-selectable options to allow a user/viewer, the dispatcher for example, to select one or more of one or more objects included in the video to be differentiated and the level of differentiation for each selected object. For example, the electronic computing device displays the user-selectable options on the display 330 of a communication device 210 of a dispatcher. FIG. 6 illustrates a graphical user interface 600 displayed on the display 330 of the communication device 210 in one example embodiment. In the example shown, the graphical user interface 600 includes an incident description textbox 605 that displays information about an incident being handled by an incident-handling dispatcher on the communication device 210. For example, the incident description textbox 605 displays the incident type and the incident location. The graphical user interface 600 also includes a video presentation area 610 where one or more videos are presented.

In some embodiments, the graphical user interface 600 includes a control options area 615 that includes one or more user-selectable options relating to at least one selected from the group consisting of the object to be differentiated and the level of differentiation of the object. In some embodiments, a user selects more than one object included in the video to be differentiated. As indicated by FIG. 6, the electronic computing device receives, via an input device, a user input selecting at least one of the one or more user-selectable options. In response to the user input selecting one or more of the user-selectable options, the electronic computing device alters the video to create the altered video (at block 520 of FIG. 5) in accordance with the user input. In other words, the user may select the manner in which each object included in the video is differentiated and the level of differentiation for each object. In some embodiments, a single object may be differentiated in multiple manners (for example, an object may be both obscured via blurring and emphasized via color saturation). In some embodiments where the display 330 is a touchscreen, the display 330 may receive a user input of a selection of an object on the video presentation area 610 while the video is being presented. While the display 330 of the communication device 210 is described in the above explanation of FIG. 6, in some embodiments, the electronic computing device controls another device on which the video is to be presented to display user-selectable object and differentiation control options. For example, when the video is presented on a device in a courtroom setting, the electronic computing device displays one or more user-selectable options to allow a user to censor and/or emphasize a video as desired before presenting the video to jurors. As another example, when the video is to be provided to a media/news agency to be shown to the public, the electronic computing device displays one or more user-selectable options to allow a user to censor and/or emphasize a video as desired before sending the video to the media/news outlet.

The graphical user interface 600 of FIG. 6 is merely an example and may include fewer or additional components. In some embodiments, the components are arranged in a different manner (for example, the video presentation area 610 may occupy a larger portion of the display 330) and the arrangement of each component may be user configurable. The control options shown in the control options area 615 are merely examples. In some embodiments, additional control options are present. For example, with respect to Officer Bob and/or Suspect 1, the electronic computing device may display more specific options of objects to be differentiated (for example, full body, face only, gun, agency logo, tattoos, and the like). In some embodiments, the control options area 615 includes a scroll bar to show additional control options and/or additional objects.

In some embodiments, the one or more user-selectable options are based on at least one of the group consisting of context information associated with the video and context information of a user of the electronic computing device. In some situations, the electronic computing device accordingly simplifies a user interface that displays user-selectable options by displaying options that specifically apply to a certain video and/or user/viewer while not displaying options that do not apply the video and/or user/viewer. For example, the electronic computing device displays user-selectable options based on one or more of an incident type of an incident that is the subject of a video, an intended use of the video (for example, for courtroom purposes or for media/news purposes), a role of a user such as a dispatcher (for example, an authorization or permission level of a user), a stress level of the user, and the like.

Figure 7:
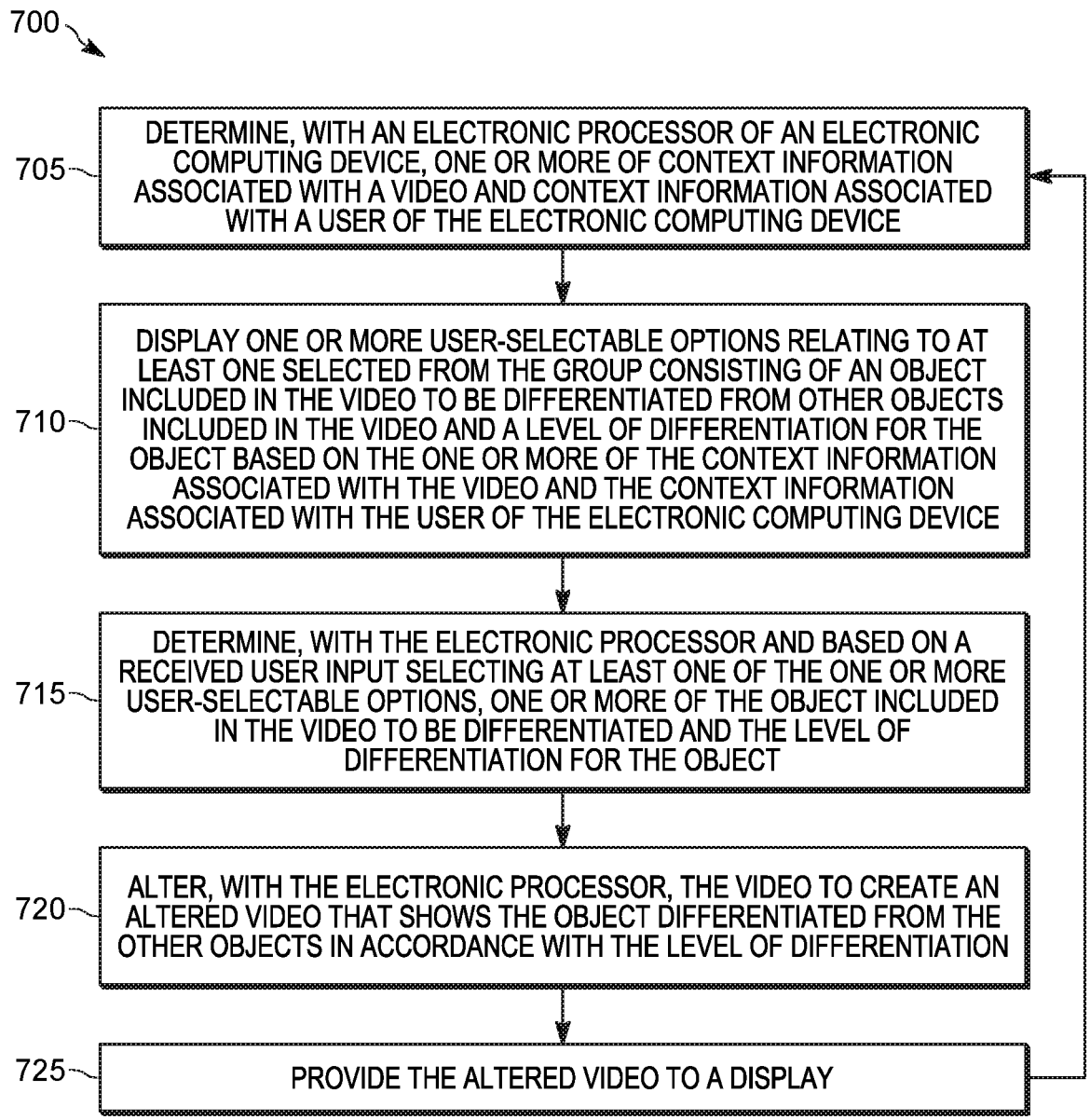
FIG. 7 is a flow chart of a method for displaying one or more user-selectable options and differentiating one or more objects in a video from other objects in the video based on user inputs corresponding to the user-selectable options being received according to one example embodiment.

FIG. 7 illustrates a flow chart of a method 700 performed by the electronic computing device for displaying one or more user-selectable options and differentiating one or more objects in a video from other objects in the video based on user inputs corresponding to the user-selectable options being received. The method 700 includes numerous blocks that are similar to the blocks of the method 500 of FIG. 5 as noted below and descriptions of corresponding elements are not repeated here. While a particular order of processing steps, message receptions, and/or message transmissions is indicated in FIG. 7 as an example, timing and ordering of such steps, receptions, and transmissions may vary where appropriate without negating the purpose and advantages of the examples set forth in detail throughout the remainder of this disclosure.

At block 705, the electronic computing device determines one or more of context information associated with a video and context information associated with a user of the electronic computing device (for example, a viewer of the video such as a dispatcher) as explained above (for example, with respect to block 505 of FIG. 5). In some embodiments, the user will be a viewer of the altered video. At block 710, the electronic computing device displays one or more user-selectable options relating to at least one selected from the group consisting of an object included in the video to be differentiated from other objects included in the video and a level of differentiation for the object based on the one or more of the context information associated with the video and the context information associated with the user of the electronic computing device.

As an example of basing the user-selectable options on the context information associated with the video, when the intended use of the video is for media/news purposes as indicated by metadata or user input, the electronic computing device displays user-selectable options relating to applying a blurring effect to faces of suspects, victims, and officers as well as logos, tattoos, and other identifiable information such as text or graphics included in the video. However, when the intended use of the video is for training purposes to review the video with a dispatcher who has already viewed the video, the electronic computing device may not display the user-selectable options to apply the blurring effect to the objects noted in the above example. Rather, the electronic computing device may only display user-selectable options to apply a blurring effect to gruesome or unpleasant objects included in the video such as a gunshot wound of an officer. In some embodiments, when the electronic computing device recognizes that a juvenile is included in the video based on the context information associated with the video, the electronic computing device applies a blurring effect to the juvenile to conceal the identity of the juvenile. In some embodiments, the electronic computing device prevents the user-selectable options with respect to the juvenile from being displayed or adjusted. For example, when the intended use of the video is for media/news purposes, a user may not be able to disable the blurring effect with respect to the juvenile. However, when the intended use of the video is for courtroom purposes, the electronic computing device may allow a user to disable the blurring effect with respect to the juvenile.

As another example of basing the user-selectable options on the context information associated with the video, when the electronic computing device determines that an officer has been wounded, the electronic computing device may display user-selectable options to allow the user to select the wounded officer or a portion of the wounded officer (such as the officer's face or wound) as an object of interest to be differentiated. The electronic computing device may also display level-of-differentiation control options with respect to the wounded officer. In this example, the options are presented in response to determining that the officer has been wounded. Thus, in some situations, the electronic computing device reduces the user-selectable options presented to the user to those options that are particularly relevant based on predetermined settings and/or historical usage data of the user as stored on a memory of the electronic computing device. In some embodiments, the electronic computing device accordingly reduces the cognitive load of a dispatcher by reducing the number of options presented on the display 330 and by displaying the most relevant options based on predetermined settings and/or historical usage data. This situation is merely one example of the electronic computing device basing the user-selectable options on the context information associated with the video. In some embodiments, the electronic computing device displays user-selectable options based on one more of the context information of the video explained above (for example, based on the context information used to identify an object of interest and/or determine a level of differentiation as described above with respect to blocks 510 and 515 of FIG. 5).

As an example of basing the user-selectable options on the context information of the user of the electronic computing device, when a dispatcher is viewing the video in real-time on a communication device 210, the electronic computing device disables and enables different user-selectable options based on context information associated with the dispatcher. For example, when the stress level of the dispatcher is below a predetermined threshold (for example, heart rate in a low range), the electronic computing device may not disable any of the user-selectable options in the control options area 615 of FIG. 6. However, when the electronic computing device determines that the stress level of the dispatcher is above the predetermined threshold, the electronic computing device may disable one or more user-selectable options. For example, the electronic computing device applies a blurring effect to a gunshot wound of the officer and to the face of the wounded officer to attempt to reduce the traumatic effect of viewing the video on the dispatcher. In this example, the electronic computing device does not allow the dispatcher to disable the blurring effect on the wounded officer unless the stress level of the dispatcher is below the predetermined threshold or unless the dispatcher is granted permission to disable the blurring effect through organizational policies and procedures (for example, permission received from a higher ranking officer or supervisor of the dispatcher). As another example of basing the user-selectable options on the context information of the user of the electronic computing device, the electronic computing device may display different user-selectable options in the control options area 615 depending on an authorization level or permission level of the user of the electronic computing device. For example, the electronic computing device displays user-selectable options when the user is a public safety commanding officer to allow the officer to enter a user input on the control options area 615 to view a video without the faces of officers and suspects included in the video obscured. However, the electronic computing device may not present user-selectable options or as many user-selectable options when the user is a lower ranking public safety officer with a lower authorization level or permission level.

At block 715, the electronic computing device determines, based on a received user input selecting at least one of the one or more user-selectable options, one or more of the object included in the video to be differentiated and the level of differentiation for the object (similar to blocks 510 and 515 of FIG. 5). At block 720, the electronic computing device alters the video to create an altered video that shows the object differentiated from the other objects in accordance with the level of differentiation as described above with respect to block 520 of FIG. 5. At block 725, the electronic computing device provides the altered video to a display to be viewed by a user as described above with respect to block 525 of FIG. 5. As indicated by the examples explained above with respect to block 715, in some embodiments, the electronic computing device executes methods 500 and 700 in conjunction so that the electronic computing device determines an initial level of differentiation for one or more objects based on context information associated with the video (at block 515) but also displays user-selectable options based on one or more of context information associated with the video and context information associated with a user of the electronic computing device. In some situations and depending on the context information, the electronic computing device changes the one or more objects and/or their respective levels of differentiation based on user input selecting one or more of the user-selectable options. Additionally, in some embodiments, the electronic computing device changes the user-selectable options based on at least one of the group consisting of the context information associated with the video and context information associated with a user of the electronic computing device. In other words, the user-selectable options to control the altered video are dynamically adjusted based on context information in some embodiments.

As explained above, while many of the above examples relate to a communication device 210 of a dispatcher, in some embodiments, the video is presented on another device similar to the communication device 210. In such embodiments, the user-selectable options described above may be displayed to the user when a video is selected to be played from a memory (for example, in a courtroom setting or a media/news setting). In some embodiments, the electronic computing device then alters the video (at block 720) and provides the altered video to a display to be viewed (at block 725) or transmits the altered video to a device where the altered video is to be presented.

Figure 8A:
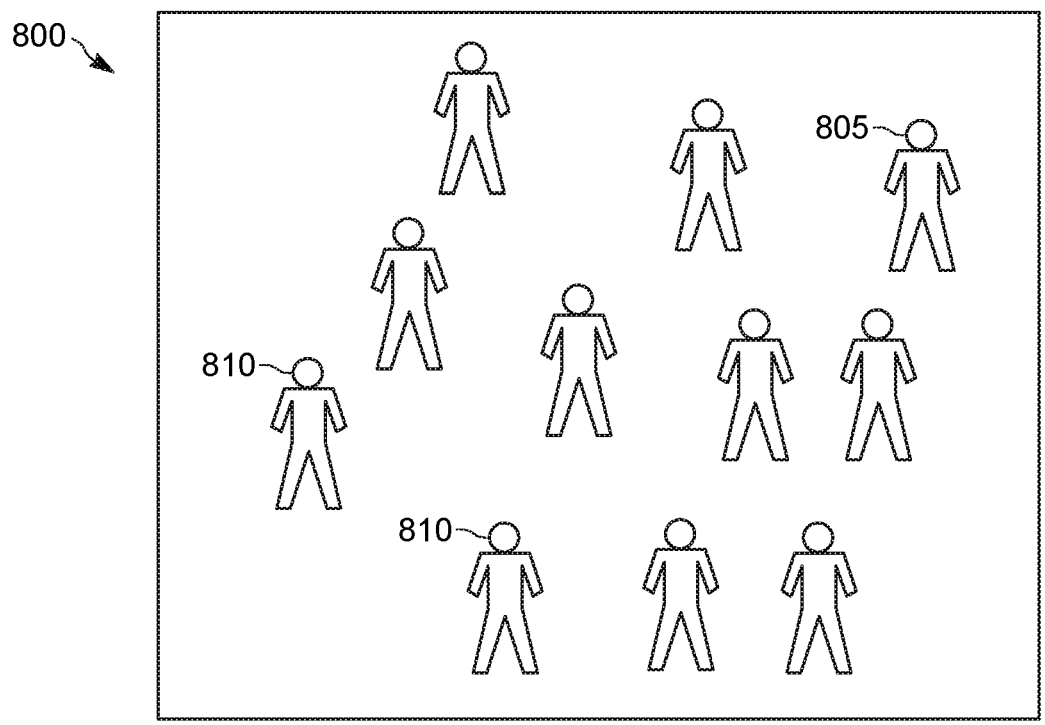
FIGS. 8A and 8B illustrate screenshots of a video presentation area of the display of FIG. 6 in an example situation.
Figure 8B:
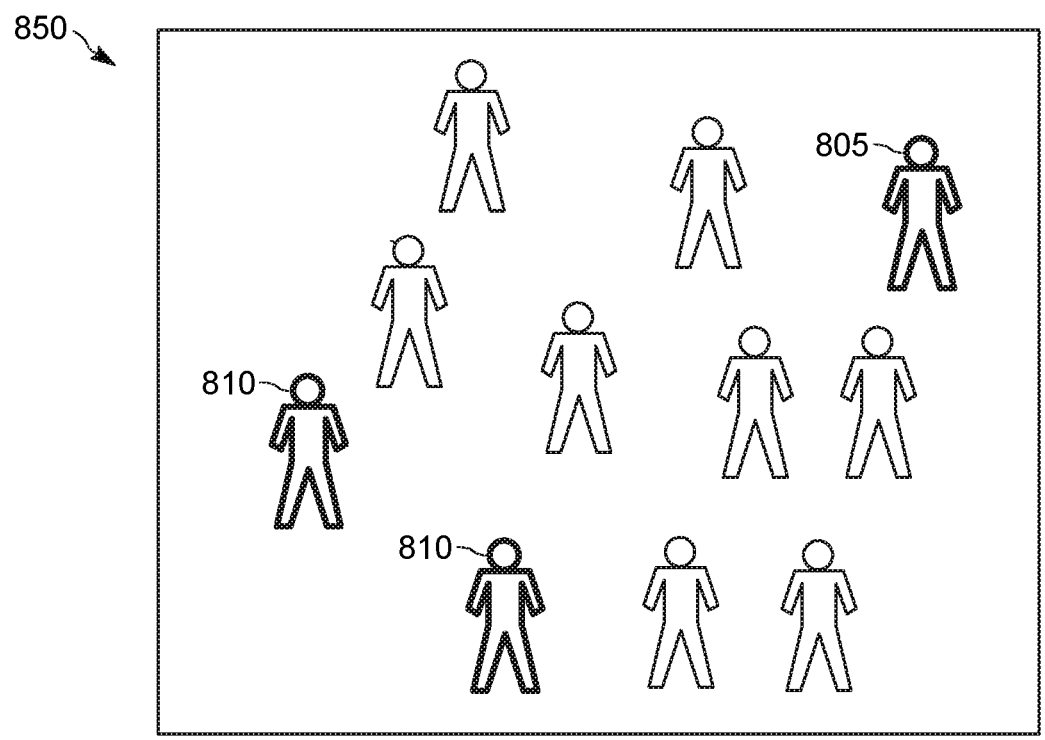

FIGS. 8A and 8B illustrate screenshots of the video presentation area 610 of FIG. 6 in an example situation. In FIG. 8A, a video 800 is being presented to a viewer, for example, a dispatcher. In some embodiments, the video 800 is being captured and transmitted to the command center 110 by a network-connectable device 105 (for example, by a camera included on public safety drone, a traffic camera, a security camera, and the like). The video 800 includes a suspect 805 being pursued by two officers 810. However, due to the number of other people included in the video 800 (for example, the suspect 805 and the officers 810 may be moving through a crowd), the dispatcher may have difficulty locating and tracking the suspect 805 and/or the officers 810. In accordance with the methods described above, in some embodiments, the electronic computing device generates an altered video 850 that emphasizes the suspect 805 and the officers 810 to allow the dispatcher to more easily locate and the track the suspect 805 and the officers 810. For example, FIG. 8B illustrates the altered video 850 with an outline of the suspect 805 and the officers 810 emphasized for ease of viewing. In some embodiments, the outline of the suspect 805 is a different color than the outline of the officers 810 to distinguish the suspect 805 from the officers 810.

Figure 9A:
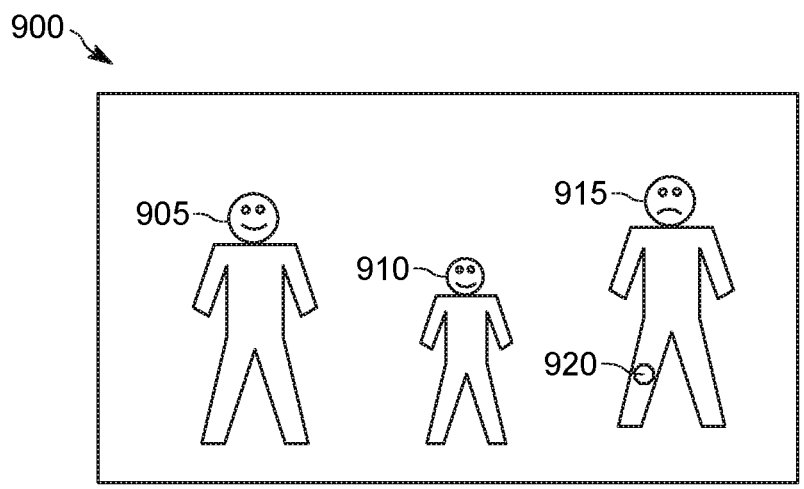
FIGS. 9A and 9B illustrate screenshots of the video presentation area of the display of FIG. 6 in another example situation.
Figure 9B:
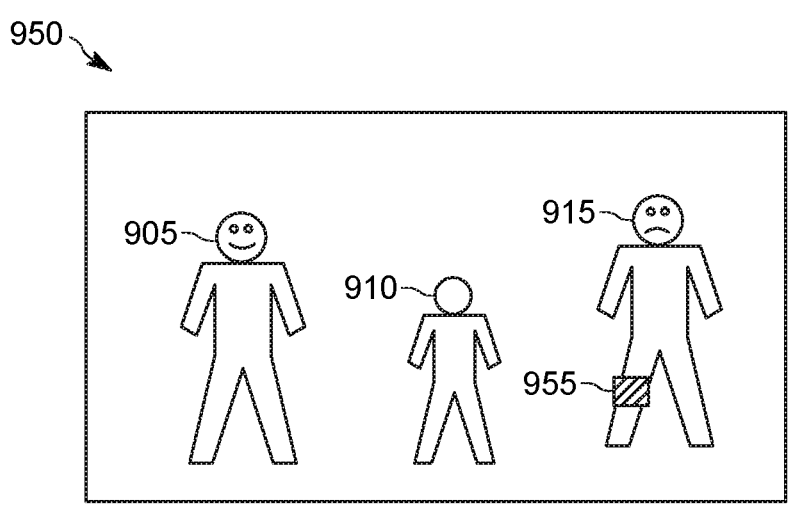

FIGS. 9A and 9B illustrate screenshots of the video presentation area 610 of FIG. 6 in another example situation. In FIG. 9A, a video 900 is being presented to a viewer such as a dispatcher. The video 900 includes a first officer 905, a juvenile 910 (for example, a child), and a second officer 915 who has a wound 920 (for example, a gunshot wound). In some situations, based on context information associated with the video as described above, the electronic computing device generates an altered video 950 to obscure some objects in the video 900 from being viewed. For example, FIG. 9B illustrates the altered video 950 where the electronic computing device has applied a blurring effect to the face of the juvenile 910 to conceal the identity of the juvenile 910. Additionally, the electronic computing device has placed a black bar 955 over the wound 920 of the second officer 915 to prevent a viewer from viewing the wound 920.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
    an electronic processor configured to
        determine context information associated with a video,
        determine an object included in the video to be differentiated from other objects included in the video,
        determine a level of differentiation for the object based on the context information,
        alter the video to create an altered video that shows the object differentiated from the other objects in accordance with the level of differentiation, and
        provide the altered video to a display.

2. The electronic computing device of claim 1, wherein the electronic processor is further configured to:
    display one or more user-selectable options relating to at least one selected from the group consisting of the object to be differentiated and the level of differentiation, wherein the one or more user-selectable options are based on at least one of the group consisting of the context information associated with the video and context information associated with a user of the electronic computing device; and
    receive, via an input device, a user input selecting at least one of the one or more user-selectable options;
    wherein the electronic processor alters the video to create the altered video in accordance with the user input.

3. The electronic computing device of claim 1, wherein the electronic processor is further configured to:
    determine that the context information associated with the video has changed;
    determine a second level of differentiation based on the changed context information,
    alter the video to create a second altered video that shows the object differentiated from the other objects in accordance with the second level of differentiation, and
    provide the second altered video to the display.

4. The electronic computing device of claim 1, wherein the electronic processor is further configured to:
    determine second context information associated with a user of the electronic computing device, wherein the user will be a viewer of the altered video; and
    determine the level of differentiation based on the context information and the second context information.

5. The electronic computing device of claim 4, wherein the electronic processor is further configured to:
    determine that the second context information associated with the user has changed;
    determine a second level of differentiation based on the context information and the changed second context information,
    alter the video to create a second altered video that shows the object differentiated from the other objects in accordance with the second level of differentiation, and
    provide the second altered video to the display.

6. The electronic computing device of claim 1, wherein the electronic processor determines the object to be differentiated based on the context information associated with the video.

7. The electronic computing device of claim 1, wherein the electronic processor is configured to alter the video to create the altered video that shows the object differentiated from the other objects by at least one of the group consisting of:
    applying a blurring effect to the object but not to the other objects;
    applying the blurring effect to the other objects but not to the object to emphasize the object;
    emphasizing an outline of the object without emphasizing outlines of the other objects;
    adjusting a color saturation of the object but not of the other objects;
    adjusting a color saturation of the other objects but not of the object to emphasize the object;
    altering a shape of the object but not of the other objects; and
    overlaying an item over at least one of the group consisting of a portion of the object and an entirety of the object but not overlaying one or more of the item and another item over the other objects.

8. The electronic computing device of claim 1, wherein the context information associated with the video includes at least one of the group consisting of an incident type of an incident included in the video, an intended use of the video, an identification of a public safety officer in the video, an identification of a public safety related object in the video, an identification of a public safety suspect in the video, an identification of members of a talkgroup in the video, and an identification of a location in the video from which a transmission was received from a communication device.

9. The electronic computing device of claim 1, further comprising a network interface configured to receive the video from a network-connectable device.

10. The electronic computing device of claim 1, wherein the electronic processor is further configured to store at least one of the group consisting of the video and the altered video in a memory.

11. A method of differentiating an object in a video, the method comprising:
  determining, with an electronic processor of an electronic computing device, context information associated with a video;
  determining, with the electronic processor, an object included in the video to be differentiated from other objects included in the video;
  determining, with the electronic processor, a level of differentiation for the object based on the context information;
  altering, with the electronic processor, the video to create an altered video that shows the object differentiated from the other objects in accordance with the level of differentiation; and
  providing the altered video to a display.

12. The method of claim 11, further comprising:
  displaying, on the display, one or more user-selectable options relating to at least one selected from the group consisting of the object to be differentiated and the level of differentiation, wherein the one or more user-selectable options are based on at least one of the group consisting of the context information associated with the video and context information associated with a user of the electronic computing device; and
  receiving, via an input device, a user input selecting at least one of the one or more user-selectable options;
  wherein altering the video includes altering the video to create the altered video in accordance with the user input.

13. The method of claim 11, further comprising:
  determining, with the electronic processor, that the context information associated with the video has changed;
  determining, with the electronic processor, a second level of differentiation based on the changed context information;
  altering, with the electronic processor, the video to create a second altered video that shows the object differentiated from the other objects in accordance with the second level of differentiation; and
  providing the second altered video to the display.

14. The method of claim 11, further comprising:
  determining, with the electronic processor, second context information associated with a user of the electronic computing device, wherein the user will be a viewer of the altered video;
  determining, with the electronic processor, the level of differentiation based on the context information and the second context information;
  determining, with the electronic processor, that the second context information associated with the user has changed;
  determining, with the electronic processor, a second level of differentiation based on the context information and the changed second context information,
  altering, with the electronic processor, the video to create a second altered video that shows the object differentiated from the other objects in accordance with the second level of differentiation, and
  providing the second altered video to the display.

15. The method of claim 11, wherein determining the object to be differentiated includes determining the object to be differentiated based on the context information associated with the video.

16. The method of claim 11, wherein altering the video to create the altered video that shows the object differentiated from the other objects includes at least one of the group consisting of:
  applying a blurring effect to the object but not to the other objects;
  applying the blurring effect to the other objects but not to the object to emphasize the object;
  emphasizing an outline of the object without emphasizing outlines of the other objects;
  adjusting a color saturation of the object but not of the other objects;
  adjusting a color saturation of the other objects but not of the object to emphasize the object;
  altering a shape of the object but not of the other objects; and
  overlaying an item over at least one of the group consisting of a portion of the object and an entirety of the object but not overlaying one or more of the item and another item over the other objects.

17. The method of claim 11, wherein determining the context information associated with the video includes determining at least one of the group consisting of an incident type of an incident included in the video, an intended use of the video, an identification of a public safety officer in the video, an identification of a public safety related object in the video, an identification of a public safety suspect in the video, an identification of members of a talkgroup in the video, and an identification of a location in the video from which a transmission was received from a communication device.

18. The method of claim 11, further comprising receiving, via a network interface, the video from a network-connectable device.

19. The method of claim 11, further comprising storing at least one of the group consisting of the video and the altered video in a memory.

20. An electronic computing device comprising:
  an electronic processor configured to
    determine one or more of context information associated with a video and context information associated with a user of the electronic computing device,
    display one or more user-selectable options relating to at least one selected from the group consisting of an object to be differentiated from other objects included in the video and a level of differentiation for the object, wherein the one or more user-selectable options are based on the one or more of the context information associated with the video and the context information associated with the user of the electronic computing device,
    determine, based on a received user input selecting at least one of the one or more user-selectable options, one or more of the object included in the video to be differentiated and the level of differentiation for the object, alter the video to create an altered video that shows the object differentiated from the other objects in accordance with the level of differentiation, and provide the altered video to a display.

* * * * *